H. P. BENNER.
SAW SET.
APPLICATION FILED MAY 6, 1916.
1,263,191.
Patented Apr. 16, 1918.
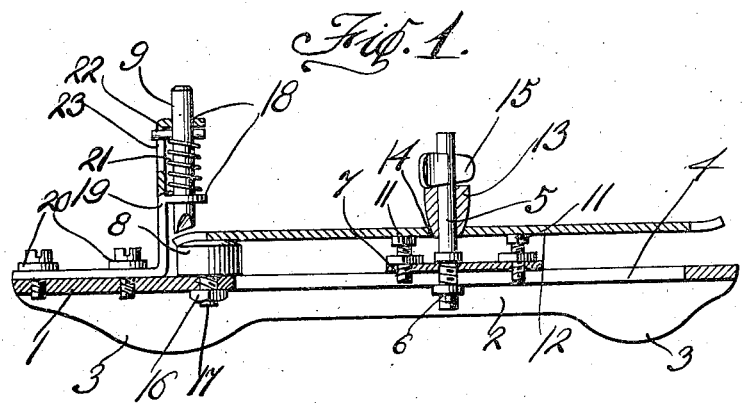
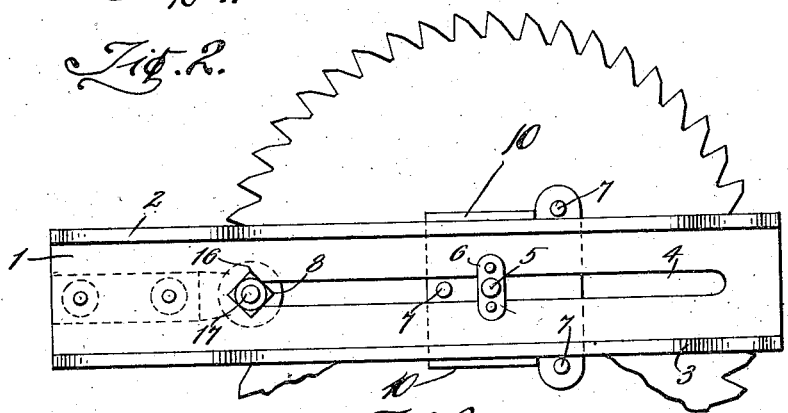
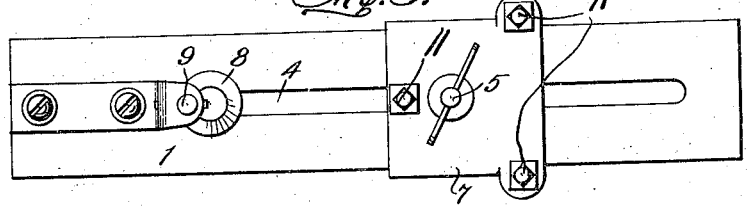
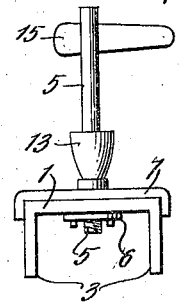
WITNESSES
INVENTOR
Herbert P. Benner
BY
ATTORNEY

UNITED STATES PATENT OFFICE.

HERBERT P. BENNER, OF BLAINE, WASHINGTON.

SAW-SET.

1,263,191. Specification of Letters Patent. Patented Apr. 16, 1918.

Application filed May 6, 1916. Serial No. 95,884.

*To all whom it may concern:*

Be it known that I, HERBERT P. BENNER, a citizen of the United States, residing at Blaine, in the county of Whatcom and State of Washington, have invented certain new and useful Improvements in Saw-Sets, of which the following is a specification.

This invention has relation to certain new and useful improvements in saw sets, and has for its primary object, the provision of a device of this character which will be readily adjustable to circular saws of various diameters and which will be highly efficient in use.

The invention has for another object, the provision of a saw set of this character in which the anvil may be readily adjusted to present a new surface when desired for coöperation with the punch.

The invention has for a further object, the provision of a saw set of this character which will be of such construction that the table may be readily adjusted upon the base with respect to the anvil and punch and a saw readily and securely mounted upon the movable post, regardless of the size of the saw.

With the above and other objects in view, the invention resides in the novel construction, combination, and arrangement of parts as hereinafter set forth in the specification, pointed out in the claims, and shown in the drawings, in which—

Figure 1 is a sectional view through the device and a saw in position upon the same;

Fig. 2 is a bottom plan with a portion of the saw broken away;

Fig. 3 is a top plan view with the saw removed;

Fig. 4 is a rear end elevation; and

Fig. 5 is a detail section of one form of saw-engaging member to be employed for preventing movement of the saw upon the post.

Referring more particularly to the drawings in which similar reference characters designate corresponding parts throughout the several views, 1 designates the base which has depending side flanges 2 provided with supporting feet 3 near the opposite ends of the device to support the base 1 in proper position upon any suitable support. The base 1 is provided with a longitudinal guide slot 4 through which extends the lower threaded end of the post 5 to receive a suitable securing nut 6 to clamp the post 5 and the movable table 7 in proper position with respect to the anvil 8 and punch 9.

The table 7 has depending side flanges 10 which engage the outer faces of the flanges 2 to prevent turning of the table 7. The table 7 also has a plurality (preferably 3) of adjustable saw supporting pegs 11 threaded therein and extending a suitable distance above the same to receive upon their heads the saw 12, as will be readily understood by referring to Fig. 1. It will also be seen that the pegs 11 may be readily adjusted to properly support the saw 12 in horizontal position. I have also provided a saw-engaging member 13 which is shown as being in the form of an inverted frusto-conical block provided with a central opening and positioned upon the movable post 5 in such manner as to permit its tapered end to project into the central opening 14 of the saw 12, and thereby prevent movement of said saw 12 upon the post 5 after the wedge 15 has been driven into the elongated vertical slot in the upper end of the post 5, said wedge 15 bearing upon the top of the member 13 to tighten the same within the opening 14.

It will also be seen by referring to the drawings that after the saw 12 has been properly placed upon the post 5 and secured in position, the post 5, together with the table 6 and saw 12, may be moved longitudinally upon the base 1 to adjust a tooth properly upon the working face of the anvil 8 and beneath the working end of the punch 9.

The anvil 8 is preferably of circular form in horizontal section, and has its upper edge beveled, as shown in the drawings, to properly coöperate with the working end of the punch 9 in the operation of setting the teeth of a saw. The anvil 8 is preferably secured in position by a nut 16 or the like secured upon the threaded extension 17 of the anvil 8 engaged through a suitable opening in the forward end of the base 1. The punch 8 is slidably engaged in the parallel perforated ears 18 of the upstanding bracket 19 which has one end bent at right angles and secured by suitable members 20 upon the forward end of the base 1, the ears 18 projecting rearwardly. The punch 9 is resiliently retained in normal or unoperated position by a suitable spring 21 engaged around the same between the ears 18 and having one end bearing against the lower ear 18, while its opposite end bears against a guide pin 22 extended through said punch 9 and having one end engaged in the guide slot 23 of the upstanding bracket 19 to properly guide the punch 9 and prevent rotation of the same.

In Fig. 5 I have shown a slightly modified form of saw engaging member 13' which is substantially cup-shaped and adapted for engaging and securing in position a saw having a large central opening. It will be understood that the construction of the saw engaging member may be readily varied as occasion may require.

While the preferred embodiments of the invention have been shown and described, it will be understood that minor changes in the details of construction, and arrangement of parts may be resorted to within the scope of the appended claims without departing from the spirit of the invention or sacrificing any of the advantages of the same.

What is claimed is:

1. In a saw set a base plate having a longitudinal slot therein, a table longitudinally adjustable on the base plate, a post extending vertically through the table and projecting within the slot, adjusting pegs vertically adjustable in the table and adapted to support a saw blade and a saw engaging member removably mounted on the post and engaged with the saw to retain the same against upward movement, an anvil mounted on the base plate and a punch reciprocable above and adapted to coöperate with the anvil for setting saw teeth.

2. A saw set, including a slotted base plate, a punch supported for vertical movement thereon, an anvil supported beneath said punch, a saw supporting table including a plate slidably mounted on said base, adjusting pegs extending upwardly from opposite corners of said plate and arranged on opposite sides of the base, an additional adjusting peg extending upwardly from the plate in alinement with the slot in said base, a vertical supporting post carried by the plate and clamping means adjustable on said post and coöperating with said adjusting pegs to clamp a saw blade therebetween, said adjusting pegs surrounding said post and arranged in triangular formation.

In testimony whereof I affix my signature in presence of two witnesses.

HERBERT P. BENNER.

Witnesses:
GEORGE S. SHAW,
MAY SHINTAFFER.

Copies of this patent may be obtained for five ,nts each, by addressing the "Commissioner of Patents, Washington, D. C."